United States Patent [19]

Howell, Jr.

[11] 4,180,603
[45] Dec. 25, 1979

[54] COATING BATH COMPOSITION AND METHOD

[75] Inventor: John K. Howell, Jr., Rochester, Mich.

[73] Assignee: Oxy Metal Industries Corporation, Warren, Mich.

[21] Appl. No.: 764,120

[22] Filed: Jan. 31, 1977

[51] Int. Cl.² .................. B05D 1/18; B05D 3/02; C08J 3/00; C08L 00/00
[52] U.S. Cl. .................. 427/353; 427/386; 427/388 A; 427/388 C; 427/435; 260/29.2 EP; 260/29.3; 260/29.4 R
[58] Field of Search .............. 427/435, 386, 388 A, 427/388 C, 353; 260/29.2 EP, 29.3, 29.4 R

[56] References Cited

U.S. PATENT DOCUMENTS

| | | | |
|---|---|---|---|
| 3,397,077 | 8/1968 | Boller et al. | 448/6.15 |
| 3,592,699 | 7/1971 | Steinbrecher et al. | 427/435 |
| 3,598,775 | 8/1971 | Huggard | 260/18 EP |
| 3,647,567 | 3/1972 | Schweri | 427/435 |
| 3,709,743 | 1/1973 | Dalton et al. | 427/435 |
| 4,043,963 | 8/1977 | Anderson | 260/29.2 EP |
| 4,136,073 | 1/1979 | Muro et al. | 427/435 |

FOREIGN PATENT DOCUMENTS 1254713  11/1971  United Kingdom ............ 427/435

*Primary Examiner*—Michael F. Esposito
*Assistant Examiner*—Richard Bueker
*Attorney, Agent, or Firm*—Arthur E. Kluegel; Richard P. Mueller

[57] ABSTRACT

An organic coating bonded to a metallic substrate and applied from an acidic, aqueous coating composition containing epoxy resin solids and a cross linking resin. The resin solids are incorporated into the coating composition as an emulsion in a water insoluble solvent, so that the reactive resin is isolated from the acidic aqueous medium. The novel composition and the novel method result in a coating which can be pigmented and which can be utilized as a final corrosion resistant coating or as an undercoat for a later applied finish coat.

9 Claims, No Drawings

COATING BATH COMPOSITION AND METHOD

BACKGROUND OF THE INVENTION

There have been developed recently various coatings for metallic surfaces which incorporate an organic coating resin, typically a styrenebutadiene copolymer or an acrylic polymer or copolymer, which is subsequently post-treated with a chromium containing solution to achieve corrosion resistance.

Generally, the coating is applied by immersing the metallic surface in an acidic aqueous coating composition containing the organic coating material, an oxidizing agent, and hydrogen ion. The thickness of the coating can be affected, for example, by such factors as total solids, pH, and concentration of the oxidant. Further, the thickness of the coating is a function of the coating time. The initial coating is adherent and, if desired, can be rinsed before being cured by baking. However, such a coating is incapable of providing effective corrosion resistance for the metallic substrate, as determined by standard salt spray tests.

The corrosion resistance of the prior art coatings is materially increased by rinsing the coating—prior to baking—in an aqueous chromium rinse solution, but appreciable chromium ion concentrations are required to give acceptable coatings. The necessary additional chromium rinse step is undesirable from both an economic and a pollution standpoint.

The above described coating compositions and coating and rinsing procedures are fully described in U.S. Pat. Nos. 3,585,084; 3,592,699; 3,791,431; 3,795,546; and 3,063,877.

From the present state of the art, as above described, it will be appreciated that there is a need for coating compositions and coating methods capable of producing adherent metal coatings possessing satisfactory corrosion resistance properties without requiring the additional rinse with chromium-containing rinse solutions.

BRIEF DESCRIPTION OF THE PRESENT INVENTION

The present invention now provides coating compositions and methods capable of producing adherent, corrosion-resistant coatings for ferrous base metals while eliminating the necessity for any post-coating treatment.

Generally, the present invention comprises an epoxy resin coating which is applied directly to the metal substrate by immersion in an acidic aqueous dispersion of the resin.

The compositions and methods of the present invention are unexpected and unusual in that the state of the art has generally recognized that epoxy resins are not stable in acidic medium and would therefore not be suitable for use in aqueous acidic coating compositions. The recognition has arisen because of the normal reactivity of the epoxide group to such medium. It has now been found, however, that epoxy-resin-containing latices can be formulated and used in novel aqueous acidic compositions which are prepared and operated in accordance with the present invention.

The compositions and methods of the present invention are characterized, in part, by the effective isolation or separation of the epoxy resin from the surrounding acidic water in which it is dispersed. This effective separation is accomplished by initially dissolving the water insoluble epoxy resin and the other coating forming materials of the composition in an essentially water immiscible organic solvent and then emulsifying this solution in water. Such emulsions are stable and resist precipitation or gellation when combined with the other materials in the final coating composition. After immersion and baking, the final, essentially epoxy resin composition of the coating provides far superior corrosion resistance than could heretofore be obtained.

More specifically, the coating bath compositions of the present invention contain the following ingredients:

1. an epoxy resin or a mixture of epoxy resins dissolved in a substantially water immiscible solvent,
2. a cross linking resin, preferably an aminoplast resin or a phenoplast resin also dissolved in the solvent, and
3. an emulsifier for the resins, ingredients, 1, 2 and 3 being added to the final bath composition preferably as a previously formed emulsion in water,
4. hydrogen peroxide as an oxidant,
5. diluent water to yield the desired, final resin solids content in the final bath composition, and
6. an acid or base to attain the desired pH range of from about 2 to about 4,
7. preferably, an iron control agent which prevents excessive levels of iron content which would tend to adversely affect coating quality.

In a preferred embodiment of the method of the present invention, the epoxy resin and the cross linking resin, each as a solution in a water immiscible solvent, are mixed, the emulsifier is added slowly and with mixing agitation. This mixture is then diluted with water under agitation until a stable aqueous emulsion is obtained. This emulsion is then mixed with additional water with a source of hydrogen ion, and iron control agent, and with hydrogen peroxide as an oxidizing agent to form the final coating bath.

The part to be coated is then immersed into the aqueous, acidic epoxy coating bath for a period of time to obtain the desired thickness of coating, the coated part is preferably rinsed with a spray of water and then oven cured.

The resultant coating is adherent, uniform, and corrosion-resistant. The coating can be pigmented as desired to form a final coat, or the coated part can be painted with conventional exterior, pigmented paints or lacquers.

OBJECTS

It is an important object of the present invention to provide on a ferrous substrate an adherent, corrosion-resistant epoxy-resin-containing latice applied from an acidic, aqueous coating composition and requiring no post-treatment prior to curing.

Another important object of this invention is the provision of a coating composition for application to a metallic substrate and comprising an acidic aqueous dispersion of a previously prepared emulsion of epoxy resin solids and cross linking resin solids with an emulsifier, hydrogen ion, hydrogen peroxide as an oxidizing agent and optionally an iron control agent.

It is a further important object of this invention to provide a method of making a coating composition by initially forming an aqueous emulsion of epoxy resin solids and cross linking resin solids dissolved in a water immiscible solvent, diluting the emulsion to a resin solids content of from 5 to 500 grams per liter, and adding an acid and hydrogen peroxide to the diluted emulsion.

DETAILED DESCRIPTION OF PREFERRED EMBODIMENTS

From the foregoing description, it will be appreciated that the coatings, the methods of coating, and the coating compositions of the present invention are essentially acidic aqueous dispersions of epoxy resins. In the coating compositions, the several ingredients are all commercially available under various trademarks or trade names, and these ingredients are defined, to the best present knowledge of applicant, as follows.

DEFINITIONS OF INGREDIENTS

Epon Resins are products of Shell Chemical Company and are epichlorohydrin/bisphenol A-type solid epoxy resins having the chemical structure:

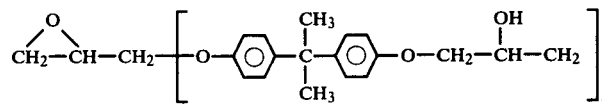 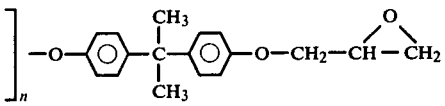

Epon Resin 1001 is such a resin having an average molecular weight of 900 (approximately), an epoxide equivalent of 450–550 and a melting point of 65°–75° C., Epon 1001-T-75 is a 75% (by weight) solution of Epon 1001 in toluene.

Epon Resin 1007 is such a resin having an average molecular weight of 2900 (approximately), an epoxide equivalent of 2000–2500 and a melting point of 125°–135° C.

Resimene X-755 is a product of Monsanto Corporation, St. Louis, Missouri, and is a methylated/butylated melamine resin.

Cymel resins are products of American Cyanamid Company, Wayne, New Jersey. Cymel 1156 is a butylated melamine-formaldehyde resin in the form of a clear liquid containing 98%±2% solids, having a Gardner-Holdt viscosity of $Z_2$–$Z_4$ at 25° C. and a water solubility of less than 1%. Cymel 1123 is a benzoguanamine-formaldehyde resin.

Beetle resins also are products of American Cyanamid Company. Beetle 80 is butylated urea-formaldehyde resin.

Uformite resins are products of Rohm and Haas Corporation. Uformite F-240N is a urea-formaldehyde resin which is 60%±2% solids having a Gardner-Holdt viscosity of $Z_1$–$Z_5$ at 25° C., and having an acid number of 2–5.

The Resimene, Cymel, Uformite and Beetle resins are all aminoplasts and are present as cross linkers in the composition.

Phenoplast cross linkers may also be used, if desired. A suitable phenol formaldehyde resin is Methylon 75108, a product of General Electric Co.

Rhoplex resins are products of Rohm & Haas Corp. Rhoplex HA12 is an emulsion of a thermosetting acrylic resin containing 44.5–45.5% solids, having a pH of 2.0–4.0, and having a minimum film forming temperature of less than 10° C.

Goodrite resins are products of B. F. Goodrich Chemical Co. Goodrite 1800×73 is a styrene-butadiene resin emulsion.

Alipal EP-110 and EP-120 are ammonium salts of a sulfate ester of an alkylphenoxy poly (ethyleneoxy) ethanol. This material is a product of GAF Corporation and serves as an emulsifier for the epoxy resins in the composition and also as a catalyst for the cross linking agent.

Dequest 2000 is a 50% by weight aqueous solution of amino tri (methylene phosphonic acid) and is a product of Monsanto Corporation.

Dequest 2041, also a product of Monsanto Corporation, is a solid of 90% ethylene diamine tetra (methylene phosphonic acid).

Dowanol DB is a product of Dow Chemical Company. The Dowanols are a series of alkyl and aryl mono ethers of ethylene glycol, propylene glycol and various polyglycols.

Cyclosol 63 is an aromatic petroleum fraction having a boiling range of about 359°–390° F. manufactured by Shell Chemical Co.

The coating compositions of the present invention are acidic, aqueous mixtures basically prepared by the formation of a resins emulsion, diluting the emulsion with water, and adding an acid, hydrogen peroxide as an oxidant, and preferably an iron control agent.

The emulsion contains a epoxy resin or a mixture of epoxy resins as a high solids content solution in a substantially water insoluble solvent; a cross linking resin also dissolved in a substantially water insoluble solvent or as a liquid; and an emulsifier.

The epoxy resin or mixture of epoxy resins are epichlorohydrin/bisphenol A-type solid epoxy resins of varying molecular weight. Preferably, epoxy resins are utilized which are either liquid or dissolved in a water insoluble solvent, the solids content being relatively high, preferably on the order of 70-90%. The initial solvent for the epoxy resins can be either a single solvent such as toluene or a mixture of solvents such as methylisobutyl ketone and toluene in any desired proportion.

The cross linker resin, preferably of either the aminoplast or phenoplast type is preferably a liquid, although high-solids solutions in solvents compatible with that of the epoxy resin can be utilized, if desired. For example, the Cymel 1156 utilized in the formulations of the present invention is a liquid, while the Uformite F-240N resin utilized as hereafter described is a solution containing about 60% solids in high-flash naphtha as a solvent.

The epoxy resin and the cross linking resin are present in various proportions ranging from about 50–90% epoxy resin and about 50–10% of the cross linking resin. The epoxy resin-to-cross linking resin ratio can vary from about 1-to-1 to about 9-to-1.

The water immiscible solvent which is utilized for disolving the resin solids is susceptible to considerable varation, preferred solvents include diisoamylketone and toluene. These solvents are preferred since they seem to yield more stable emulsions and the resultant final coatings are glossy and non-grainy. Acceptable emulsions and coatings can also be obtained utilizing the other solvents, for example, cyclohexanone, Cyclosol 63, Dowanol DB, diisobutylketone, methylheptylketone, ethylamylketone, methylisoamylketone, and methylisobutylketone. Of course, mixtures of the various solvents may be utilized, and several of the following examples utilize such mixtures.

Apparently, the utilization of the water immiscible organic solvent serves the purpose of separating the epoxy resin from the surrounding acidic water in the final coating composition. By dissolving the water insoluble resin and other coating materials in such a water insoluble organic solvent and then emulsifying this mixture in the water, it has been found that such emulsions or latices are much more stable toward precipitation or gelation when combined with the other materials in the composition. So far as is presently known, the utilization of such solvents and the formation of initial epoxy-containing solutions for later emulsification in the water is necessary to provide stable coating compositions and to offset the normal reactivity of the epoxide group and the cross linking agent.

The solvent must be miscible with the epoxy resin and the cross linking resin at the appropriate solids level to form a single stable phase. Further, the solvent must be non-reactive with the resin solids. Preferably, the solvent is not more than 10% soluble in water—to prevent any appreciable dispersion of the solvent into the aqueous coating bath so that the resin becomes unstable in its emulsion. Conversely, preferably water is no more than 20% soluble in the solvent—to prevent the intrusion of any water-carried acid into the resin for reaction prior to the formation of the coating in the coating bath.

It has been found that the utilization of Alipal EP-110 and EP-120 are particularly useful. These materials are ammonium salts of sulphate esters of alkylphenoxy poly (ethyleneoxy) ethanols. Such materials serve both as an emulsifier for the epoxy resins in the composition and can also serve as a catalyst for the aminoplast or phenoplast cross linking agent. Relatively small amounts of the emulsifier are required ranging generally from about 2% to about 10%.

While the initial emulsion can be prepared in several different ways, the method generally utilized is the initial mixing of the epoxy resin and the cross linking resin in the water immiscible solvent at a somewhat elevated temperature on the order of from 100° to about 150° F. The emulsifier is then slowly added over a period of time without additional heat and with sufficient agitation to keep the materials agitated and in suspension. The addition of the emulsifying agent increases the viscosity of the composition to about the consistency of jello. Water, preferably de-ionized, is then added, initially very slowly and then more rapidly. During the addition of the water, the emulsion "inverts", that is the emulsion viscosity initially increases and then decreases. The amount of water which is added, generally is sufficient to reduce the nonvolatile content of the emulsion to a value ranging from about 15% to about 50% and the amount of water and the ratio of water to organic solvent can range from about 95/5 to about 75/25.

After the emulsion has been prepared, a coating bath is prepared by diluting the bath with de-ionized water, adding acid and hydrogen peroxide as an oxidizing agent.

The amount of diluent water added is, of course, determined by the desired resin solids content of the final bath, the desired resin solids content ranging from about 5 to about 500 grams per liter and preferably falling within the range of about 100 to 200 grams per liter.

The acid which is added to the coating bath, of course, serves as a source of hydrogen ion, and a wide variety of acids may be utilized. The preferred acids are simple halogen or complex halogen acids. For example, it has been found that hydrofluoric acid (HF) or $H_2TiF_6$ are particularly useful, since they yield coatings of enhanced salt spray resistance and are effective over a broader range of concentration, simplifying control procedures during use. Other suitable acids include acetic, sulfuric, phosphoric ($H_3PO_4$) in combination with HF, hydrochloric (HCl), and $H_2SiF_6$. The acid must be capable of attacking the ferrous substrate and is present to yield a pH in the final coating bath ranging from about 2 to about 4. It has been found that amounts of acid ranging from 0.25 grams per liter to about 8.0 grams per liter of the preferred acids can be utilized, although no appreciable improvement was noted over about 2 grams per liter. Preferably, the amounts of acid required range from about 1 to 2 grams per liter.

Apparently, the function of the oxidizing agent is to oxidize to ferric ions those ferrous ions produced at the surface of the plate or panel being coated. This, appears to adhere or to fix the resin coating to the surface of the panel or object being coated.

It has been found that hydrogen peroxide ($H_2O_2$) when added as an oxidizing agent to the bath in an amount ranging from about 1 gram to about 5 grams per liter yields adherent, water rinsable coatings.

During operation of the bath, soluble iron fluorides form and must be held to a minimum. The tolerance of the bath appears to be about 500 to 600 parts per million of such fluorides. To control the bath, a precipitating agent is added, rather than a sequestering agent. The precipitating agent preferably is capable of precipitating iron-agent complexes at the operating pH of the bath, i.e., at a pH of from about 2 to 4. Dequest 2000 is acidic and is added to (1) precipitate iron as an iron-Dequest complex and (2) to control the pH of the bath at about 2.7. Make-up HF is added to maintain $F^-$ concentration at about 0.1% In the normal operating range of the bath, the non-chelated or non-sequestered soluble iron concentration preferably is maintained at a level of less than about 400 parts per million, and below a maximum level of 600 parts per million.

While Dequest 2000 is the preferred iron control agent, Dequest 2041 or phytic acid have been found effective and can also be utilized. The utilization of phosphoric acid in combination with $H_2SiF_6$ has been found to be effective, again substantially reducing the amount of soluble iron in the supernatent solution.

The panel or part to be coated is immersed in the final coating bath for a period of time, preferably ranging from about 30 to about 90 seconds, although greater or lesser amounts of time of immersion can be utilized where a thicker or thinner coating is desired. The ferrous part to be coated is vigorously attacked by the acid as the cross linked epoxy coating builds up. Generally, the thickness of the coating is directly proportional to the time of immersion, with coatings on the order of from less than about 0.1 mil thickness to about 1 mil thickness being readily obtainable.

Following coating, the coated part is baked for curing. Prior to curing, the coated part preferably is water rinsed to remove excess coating composition not adhered to the part. Such rinsing promotes the formation of uniform, bead-free coatings.

The baking or curing is carried out in an oven at temperatures of from about 200° F. to about 500° F. and for periods of time ranging from about 5 minutes to about 20 minutes. As would be expected, the curing conditions vary with the resin employed, the epoxy-to-cross linking resin ratio, the thickness of the coating, etc.

The uses of the coating are varied, ranging from an automobile undercoating, to an undercoat to receive a later applied paint. The coating can be pigmented by the addition of pigment to the coating bath.

The percent non-volatiles of the coating bath are adjusted for the required end use. As a paint base, non-volatile concentrations of from about 0.6% up to about 20% have given excellent results. As a pigmented coating, the higher concentrations are more practical, e.g., from about 5% to about 20%. At higher concentrations greater film thicknesses are obtained.

EXAMPLES

Emulsion I

An emulsion was prepared having the composition:

| Material | PBW | Grams |
| --- | --- | --- |
| Epon 1001-T-75 | 200.0 | 6,000. |
| Cymel 1156 | 38.0 | 1,140. |
| Alipal EP-120 | 38.0 | 1,140. |
| Deionized water | 724.0 | 21,720. |
|  | 1000.0 | 30,000. |

The emulsion was prepared by the following procedure:

The Epon 1001-T-75 and Cymel 1156 are charged to a tared pail about 13 inches in diameter and approximately 45 liters capability. Using heating mantels, the resin are heated to about 120°–130° F. and mixed for about 10 minutes at 800 rpm on a Shar Model S-20 Disperser fitted with a Shar 6 inch impeller. The heat is shut off and the Alipal EP-120 is slowly added over a 10 minute period to the center of the vortex and the speed of the disperser is increased as necessary up to about 4000 rpm to keep the materials agitated. As the last of the Alipal EP-120 is added, the viscosity of the composition increases to such a degree that the material has the consistency of jelly. The deionized water is added, very slowly at first. As the emulsion "inverts", i.e., passes through a viscosity maximum and then decreases, the speed of the disperser is gradually slowed. Scraping the sides of the pail with a spatula may be necessary to keep all the materials mixing uniformly. After inversion, the balance of the deionized water is added fairly rapidly at a disperser speed of 800 rpm. Mixing at this speed for an additional five minutes completes the preparation.

Emulsion I had the following properties:

| | |
| --- | --- |
| Non-volatile (N.V.) content | 20% |
| Water/organic solvent ratio | 92.8/7.2 by volume |
| An epoxy/resin/melamine-formaldehyde ratio | 80/20 (solids basis) |

Emulsion II

An emulsion was prepared having the following composition:

| Formulation | % Weight |
| --- | --- |
| Epon Resin 1007(75% in ethyl amyl Ketone/ Cyclosol 63, 4/1 vol.) | 39.04 |
| Epon Resin 1001 (75% in ethyl amyl Ketone/ Cyclosol 63, 4/1 vol.) | 4.34 |
| Alipal EP-110 | 5.83 |
| Resimene X-755 | 2.48 |
| Demineralized water, first addition | 14.65 |
| Natrosol 250HR, 1% | 19.23 |
| Demineralized water, final addition | 14.43 |
| | 100.00 |

The emulsion was prepared using a procedure similar to that outlined for Emulsion I above.

| Emulsion II had the following Properties: | |
| --- | --- |
| Non-volatile, % w | 37.0 |
| Viscosity, secs, No. 4 Ford Cup at 37% non-volatile | 16.0 |
| Viscosity, at 33% non-volatile | 13.0 |
| at 30% non-volatile | 12.0 |
| Water/organic solvent, by volume | 80/20 |
| pH (adjusted with dimethylethanolamine) | 7.0–7.5 |
| Epon Resin/Resimene X-755 | 93/7 |
| Epon Resin 1007/1001 | 90/10 |

Emulsion III

An emulsion was prepared having the following composition:

| Formulation | Weight Percent |
| --- | --- |
| Epon Resin 1001/1007 Solution | 33.37 |
| Uformite F-240-N | 11.26 |
| Alipal EP-120 | 5.96 |
| Demineralized water, First addition | 14.98 |
| Demineralized water, Second addition | 34.43 |

Epon Resin 1001/1007 Solution is a 1:1 blend of Epon Resins 1001 and 1007, 81% non-volatile in methylisobutyl Ketone/toluene, 4/1 by volume.

Emulsion III was prepared using a procedure similar to that outlined for Emulsion I above.

| Emulsion III had the following Properties: | |
| --- | --- |
| Non-Volatile, & w | 35.6 |
| Viscosity, seconds, No. 4 Ford Cup | 12.0 |
| Water/Organic Solvent, by volume | 80/20 |
| pH | 6.0 |
| Epon Resin/Uformite F-240-N | 80/20 |

Emulsion IV

An emulsion was prepared having the following composition:

| Component | Weight Percent: |
| --- | --- |
| Epon 1001 | 29.74 |
| Toluene | 9.92 |
| Cymel 1156 | 7.44 |
| Alipal EP 120 | 9.42 |
| Deionized water | balance |

Emulsion IV was prepared using a procedure similar to that outlined above for Emulsion I.

Emulsion V

An emulsion of the following composition was prepared by the procedure outlined above for Emulsion I:

| Material | Grams |
|---|---|
| Epon 1001, 75 wt. % in DIAK | 139.0 |
| Methylon 75108 | 44.8 |
| Alipal EP-120 | 36.8 |
| DIW | Enough to make 800 g |

Emulsion VI

An emulsion, quite similar to Emulsion III, was prepared as in Emulsion I above. This emulsion had the following composition and properties:

| Formulation: | |
|---|---|
| Epon Resin 1001/1007 solution | 33.37 |
| Uformite F-240N | 11.26 |
| Alipal EP-120 | 5.96 |
| Demineralized water, first addition | 12.32 |
| Demineralized water, second addition | 37.09 |
| | 100.00 |

| Emulsion Properties: | |
|---|---|
| Non-volatile, % w | 35.7 |
| Viscosity, seconds #4 Ford Cup | 12 |
| Water/organic solvent, by volume | 80/20 |
| pH | 5.75 |
| Epon Resin/Uformite F-240N (solids basis) | 80/20 |

COATING EXAMPLE I

A coating bath was prepared from Emulsion II above, the coating bath having the composition:

| Ingredient | |
|---|---|
| Emulsion II | 137 g |
| Deionized water | sufficient to make 1 liter |
| HF (50%) | 1.0 ml. |
| $H_2O_2$ (35%) | 3.5 gm |

The bath contained about 50 grams per liter of resin solids and had a pH of 2.8.

Several 3"×5" cold rolled steel panels were cleaned in a commercial alkaline immersion cleaner for 8 minutes, hot water rinsed for one minute, treated in the aqueous, acidic epoxy emulsion coating bath for the times specified in the table below, optionally rinsed with sprayed deionized water for 7 seconds, and over dried for 5 minutes at 350° F. The resinous coating bath was slowly stirred during coating and was at room temperature. The appearances of the coated panels were then noted:

| Panel | Coating time/DIW rinse | Appearance |
|---|---|---|
| 947926 | 2 m | glossy lacquer - bead |
| 947927 | 2 m/7 sec. DIW | glossy lacquer - no bead |
| 947928 | 4 m | glossy lacquer - bead |
| 947929 | 4 m/7 sec. DIW | glossy lacquer - no bead |
| 947930 | 8 m | glossy lacquer - bead |
| 947031 | 8 m/7 sec. DIW | glossy lacquer - no bead |

Using a Mikrotest magnetic film thickness gauge, the coating thickness was found to be 0.3–0.4 mils in all cases.

COATING EXAMPLE II

Several resinous coating baths were prepared in order to evaluate the corrosion resistance of coatings produced from epoxy based emulsions versus the corrosion resistance of coatings produced from acrylic and styrene-butadiene emulsions. All of the resin coating baths were 3.8 liters in volume and contained enough resin to give 4% (w/v) resin solids. Each bath was adjusted to about pH 2.6–3.2 with 50% HF and each contained 1 g/l $H_2O_2$ added as a 35% solution.

The resins used were as follows:

| Resin | Type | % Total Solids | Emulsion Gms/3.8 l |
|---|---|---|---|
| Emulsion II | epoxy-melamine | 37 | 411 |
| Rhoplex HA-12 | acrylic | 45 | 338 |
| Goodrite 1800X73 | styrene-butadiene | 43 | 353 |
| Emulsion III | epoxy-urea | 35.6 | 428 |

The first three resin coating baths were not pigmented. The resin coating bath prepared from Emulsion III was pigmented by adding 51.3 grams of Calcotone NI Paste, a 37% non-volatile black pigment dispersion sold by American Cyanamid Corp., to give a pigment level of about 5 g/l.

A series of 4"×6" cold rolled steel panels were cleaned in an alkaline immersion cleaner, hot water rinsed, then treated in one of the four above described coating baths for the times noted in the following Table, optionally rinsed with a deionized water spray as indicated, then oven dried for the time and temperatures noted in the Table. Four of the six panels processed for each variation were finished with a commercial white enamel, Dulux 7046731; the fifth panel was used for determination of coating weight and the sixth was used for inspection purposes. Of the four finished panels, two were subjected to the ASTM B-117-61 salt spray test, one was subjected to the ASTM 2247-64T humidity test, and the last was subjected to several physical tests, including conical mandrel bending (ASTM 0522-60), convex impact (1.10 impression with ½" ball), and knife blade adhesion. Table 1 indicates the resin solution, the processing conditions, the numbers of the panels tested, the determined coating weight, and the physical test results. Table 2 indicates the results of the humidity and salt spray tests.

TABLE I

| Resin Solution | Time | Oven Cure | Panel No. | Panel | Ct. Wt. Mgms/ft$^2$ | Panel | Conical Mandrel | Convex Impact | Adhesion |
|---|---|---|---|---|---|---|---|---|---|
| Emulsion II | 2 | 10 m at 400° F. | 101–106 | 105 | 1126.8 | 101 | N | 1F | 10 |
| | 2 di | | 107–112 | 111 | 962.1 | 107 | 1F | 1F | 10 |
| | 4 | | 113–118 | 117 | 508.2 | 113 | N | 1.5F | 10 |

TABLE I-continued

| Resin Solution | Time | Oven Cure | Panel No. | Panel | Ct. Wt. Mgms/ft$^2$ | Panel | Conical Mandrel | Convex Impact | Adhesion |
|---|---|---|---|---|---|---|---|---|---|
| | 4 di | | 119–124 | 123 | 808.2 | 119 | N | 1.5F | 10 |
| Rhoplex HA-12 | 2 | 5 m at | 125–130 | 129 | 1411.2 | 125 | 4F | 2.5P | 10 |
| | 2 di | 275° F. | 131–136 | 135 | 1633.5 | 131 | 1F | 2.5P | 6 |
| | 4 | | 137–142 | 141 | 1283.4 | 137 | 2F | 2P | 10 |
| | 4 di | | 143–148 | 147 | 1316.7 | 143 | N | 2.5P | 9 |
| Goodrite | 2 | 3 m at | 149–154 | 153 | 2030.4 | 149 | 5F | 2P | 10 |
| 1800X73 | 2 di | 325° F. | 155–160 | 159 | 1860.6 | 155 | 3F | 2P | 10 |
| | 4 | | 161–166 | 165 | 3569.0 | 161 | 10F | 1P | 10 |
| | 4 di | | 167–172 | 171 | 3311.4 | 167 | 8F | 1P | 10 |
| Emulsion III | 2 | 10 m at | 173–178 | 177 | 2253.0 | 173 | N | 1.5P | 10 |
| | 2 di | 400° F. | 179–184 | 183 | 450.3 | 179 | N | 1F | 10 |
| | 4 | | 185–190 | 189 | 2702.7 | 185 | 3F | 1.5P | 10 |
| | 4 di | | 191–196 | 195 | 1212.3 | 191 | N | 1F | 10 |
| Bare Steel | | | 197–200 | — | — | 197 | N | 1P | 10 |

TABLE 2

| Resin Soln. | Time | Panel | HUMIDITY 168 hrs. | HUMIDITY 336 hrs. | Panel | SALT SPRAY 168 hrs. | SALT SPRAY 336 hrs. |
|---|---|---|---|---|---|---|---|
| Emulsion II | 2 | 102 | 10 | 10 | 103 | 0–1$^s$ | 1–1$^{2s}$ |
| | | | | | 104 | 0–1 | 1–1$^{2s}$ |
| | 2 di | 108 | 10 | 10 | 109 | 0–1 | 1–1 |
| | | | | | 110 | 0–1 | 1–2 |
| | 4 | 114 | 10 | 10 | 115 | 0–1 | 1–1 |
| | | | | | 116 | 0–1 | 1–1 |
| | 4 di | 120 | 10 | 10 | 121 | 0–1 | 1–2 |
| | | | | | 122 | 0–1 | 1–2 |
| Rhoplex HA-12 (Acrylic) | 2 | 126 | 10 | 10 | 127 | 70%P | — |
| | | | | | 128 | 70%P | — |
| | 2 di | 132 | 10 | 10 | 133 | 70%P | |
| | | | | | 134 | 70%P | |
| | 4 | 138 | 10 | 10 | 139 | 60%P | |
| | | | | | 140 | 2–13 | |
| | 4 di | 144 | 10 | 10 | 145 | 80%P | |
| | | | | | 146 | 80%P | |
| Goodrite 1800X73 (styrene-butadiene) | 2 | 150 | 10 | 10 | 151 | 6–7 | |
| | | | | | 152 | 2–3 | 5–6, 55% rust |
| | 2 di | 156 | 10 | 10 | 157 | 1–2 | 2–4, 65% rust |
| | | | | | 158 | 0–4 | 10%P, 60% rust |
| | 4 | 162 | 10 | 10 | 163 | 5–6 | |
| | | | | | 164 | N | 1–3, 25% R |
| | 4 di | 168 | 10 | 10 | 169 | N | 2–3, 35% R |
| | | | | | 170 | N | 1–3, 30% R |
| Emulsion III | 2 | 174 | 10 | 10 | 175 | N | 1–1 |
| | | | | | 176 | 0–1$^s$ | 1–1 |
| | 2 di | 180 | 10 | 10 | 181 | 0–1 | 1–2$^{4s}$ |
| | | | | | 182 | 0–1 | 1–2 |
| | 4 | 186 | 10 | 10 | 187 | 0–1 | 1–1 |
| | | | | | 188 | 0–1 | 1–1 |
| | 4 di | 192 | 10 | C9 | 193 | 0–1 | 1–1 |
| | | | | | 194 | 0–1$^{2s}$ | 1–3$^{5s}$ |
| Bare Steel | | 198 | C8/VF9 | F9 | 199 | 95%P | |
| | | | | | 200 | 95%P | |

COATING EXAMPLE III

An aqueous, acidic coating composition was prepared by diluting 1900 ml. of the above Emulsion I with 1900 ml deionized water to give about 100 g/l resin solids and a volume of 3.8 l. To this was added 51.3 gm Calcotone Black NI, a black pigment dispersion sold by American Cyanamid Corp., to give a pigment level of about 5 g/l. 6.3 ml. 50% HF and 13.3 ml. 25% $H_3PO_4$ were added to give about 1 g/l each of HF and $H_3PO_4$. Finally 24.0 gms of concentrated $H_2O_2$ was added to give an $H_2O_2$ concentration of between 1.0 and 2.0 g/l. The pH of this bath, rapidly agitated with a Lightnin mixer, was found to be 2.3.

A multitude of parts including small cold rolled steel brackets, clips, washers, etc., were processed by alkaline immersion cleaning, water rinsing, immersing in the aqueous acidic epoxy coating composition for 90 seconds, deionized water spray rinsing for 30 seconds, and finally oven drying for 10 minutes at 400° F. All these parts were given an excellent glossy black uniform finish of about 0.3–0.4 mils in thickness. Other parts which had large amounts of scale were also processed as above; these parts, except in the areas of heavy scale, also were well coated.

COATING EXAMPLE IV

Several resinous pigmented coating baths were prepared in order to evaluate the salt spray resistance of coatings produced from an epoxy/melamine-formaldehyde emulsion versus the corrosion resistance of coatings produced from acrylic and styrene-butadiene emulsions.

In Coating Example II above, coatings from epoxy based emulsions were also compared to coatings from acrylic and styrene-butatiene emulsions. However, in Example II, these coatings were tested as "underlying coatings" or paint-bases. In this Example IV, coatings are tested as pigmented coatings requiring no further finishing.

The resinous coating baths were all 3.6 liters in volume and were prepared to contain the following components:

100 g/l resin solids
2.1 g/l HF
2.3 g/l $H_2O_2$
5.0 g/l Black pigment

The sources of the resin solids were as follows:
Epoxy/melamine-formaldehyde: Emulsion I above
Styrene-butadiene: Phiolite 491 (Goodyear Tire & Rubber Co.)
Acrylic: Rhoplex HA-12 (Rohm & Haas Co.)

Cold rolled steel panels, 4"×6", were cleaned with an alkaline immersion cleaner, warm water rinsed, and immersed for five minutes with agitation in each of the above resinous coating baths. Upon being withdrawn from the coating baths, it was observed that resinous coatings had formed on all of the panels. The adherent resinous coatings were spray rinsed with deionized water for 30 seconds and either rinsed with an aqueous chromium containing rinse solution for 30 seconds at room temperature or not rinsed as indicated below. Thereafter, the resinous coated panels were placed in an oven having a temperature of 200° C. for 10 minutes. After being withdrawn from the oven, the appearance of the resinous coatings were observed and it was seen that all were glossy black and uniformly coated. Certain areas of the panels coated with the styrene-butadine emulsion had areas of wet film adhesion failure, i.e., bare areas resulting from non-adherance of the resinous film during deionized water spray rinsing. None of the other two coating commpositions gave panels which failed in that manner, however. Film thicknesses were determined on all of the panels. For those panels coated in the styrene-butadene emulsion composition, film thickness averaged 0.9 mils. However, for the epoxy/melamine-formaldehyde emulsion composition, film thickness averaged only 0.07–0.15 mils. All of the panels were scribed and subjected to the ASTM B-117 salt spray test for 144 hours, the results of which are indicated in the table below:

The $Cr^{6+}$/reduced Cr rinse solutions that were used in the examples were prepared according to the method described in U.S. Pat. No. 3,279,958 to Maurer et al. This involved reacting appropriate amounts of methanol and $CrO_3$ in aqueous solution at elevated temperatures until the desired $Cr^{6+}$/reduced Cr molar ratio was attained. Thus a solution containing 28.6% $CrO_3$ was reacted until 19.2% $CrO_3$ remained. The original solution contained 14.9% $Cr^{6+}$ and the final solution contained 10.0% $Cr^{6+}$, meaning 4.9% Cr had been reduced and the ratio of $Cr^{6+}$/reduced Cr was 2.04. From this concentrate, rinse solutions were prepared to contain total chromium concentrations of 1.09 and 4.37 g/l.

The table shows the results that were obtained after 144 hours salt spray. Panels were tested in triplicate.

| | | | Salt Spray | | | |
|---|---|---|---|---|---|---|
| | No Post-treatment | | 1.09 g/l Cr | | 4.37 g/l Cr | |
| Resin Source | Panel | 144 hrs. | Panel | 144 hrs. | Panel | 144 hrs. |
| Pliolite 491 (Styrene-butadine) | 820 | $6-8^{F6}$ | 825 | 2-3 | 830 | $0-1^S$ |
| | 821 | $3-7^{M6}$ | 826 | $1-3^{5s}$ | 831 | VF9 |
| | 822 | $5-6^{F8}$ | 827 | $2-3^{4s}$ | 832 | N |
| Rhoplex HA-12 (acrylic) | 835 | 80%P | 840 | 80%P | 845 | 80%P |
| | 836 | 80%P | 841 | 80%P | 846 | 80%P |
| | 851 | 80%P | 842 | 80%P | 847 | 70%P |
| Emulsion I | 850 | $0-1^{F9}$ | 855 | $0-1^{F9}$ | 860 | $0-1^{F9}$ |
| | 851 | $0-1^{F9}$ | 856 | $0-1^{M9}$ | 861 | $0-1^{F9}$ |
| | 852 | $0-1^{F9}$ | 857 | $0-1^{M9}$ | 862 | $0-1^{F9}$, 2%P |

As can be seen, even though much thinner films were obtained with the epoxy/melamine-formaldehyde system of Emulsion I (which caused the small amount of face rusting), there was virtually no scribe creepage after 144 hours when no post-treatment was used, while the styrene-butadene and acrylic systems showed extensive scribe creepage after 144 hours when no post-treatment was used. In fact, it required the additional step of post-treating the styrene-butadene resin coated parts in the 4.37 g/l Cr solution to bring their corrosion resistance up to the level exhibited by the epoxy melamine-formaldehyde system without any additional post-treatments.

COATING EXAMPLE V

This Example was run to compare the emulsion of Emulsion VI with a conventional zinc phosphate conversion coating, both coatings being used as a paint undercoat.

1065 grams of Emulsion VI per 3.8 liters provides about 100 g/l resin solids. 16.0 mls 50% HF were added to give a $F^-$ concentration of about 2.4 g/l (calculated). Finally, sufficient $H_2O_2$ was added to give a concentration of 2.1 g/l.

4"×6" cold rolled steel panels and 4"×6" hot dipped galvanized, minimum spangle, panels were processed as follows:
1. 10 m. alkaline immersion cleaner, 8 oz/gal, 200° F.
2. 1 m warm water rinse, overflowing.
3. 90 s coating bath, ambient temperature, agitated.
4. 1 m deionized water rinse, spray.
5. 10 m at 400° F., dry-off.

Film thicknesses averaged 0.3–0.4 mils for the steel panels and 0.4–0.7 mils for the hot dipped galvanized panels. These panels were finished with the Ford ESB-103A guide coat and ESB-1619 top coat.

In several laboratory spray tanks of five gallon capacity each were prepared the following solutions: alkaline cleaner, 1 oz/gal, 150° F.; aqueous acidic zinc phosphate conversion coating solution containing 1.8 g/l zinc ions, 6.1 g/l phosphate ions, 0.11 g/l nitrate ions, 0.12 g/l nickel ions, 0.3 g/l fluoride ions, and 2.0 g/l nitrate ions (this solution was heated to 150° F., and when titrated in the conventional manner, was found to have a total acid of 7.3–7.4 points and a free acid of 0.6–0.7 points); post-treatment solution, containing 0.5 g/l quebracho extract, adjusted to pH 4.9–5.1 with phosphoric acid.

4"×6" cold rolled steel panels and 4"×6" hot dipped galvanized minimum spangle, panels were processed as follows:
1. One minute alkaline spray clean.
2. One-half minute warm water rinse.
3. One minute zinc phosphate solution.
4. One-half minute cold water rinse.
5. One-half minute post-treatment solution.
6. Ten second deionized water rinse.
7. 5 m at 350° F., dry-off.

These panels were then electropainted with Ford ICPD #1539 electropaint to a dry film thickness of 0.6 mil (cold rolled steel) or 0.2–0.4 mil (hot dipped galvanized), water rinsed, then baked for 20 minutes at 360° F. Following this, the panels were finished with Ford ESB-103A guide coat and ESB-1619 top coat.

The panels were then submitted for salt spray and humidity testing with the following results:

| Process | Salt Spray 168 hrs. | | Humidity, 336 hrs. | |
|---|---|---|---|---|
| | C.R.S. | HDG | C.R.S. | H.D.G. |
| Epoxy/urea Formaldehyde Coating | 1–1 1–1 | N* N* | 10 | 10 |
| Conventional Zinc Phosphate Conversion Coating | 1–3 1–2$^{3s}$ | 0–1 0–1 | G9 | 10 |

*Blistered along scribe

COATING EXAMPLE VI

A coating bath was prepared having the composition:

| Component | Parts by Volume |
|---|---|
| Emulsion IV | 1750 ml |
| HF (50%) | 6.5 ml |
| $H_2O_2$ (30%) | 32 ml |
| Dequest 2000 | 11.5 ml |
| Deionized water | sufficient for 7 liters |

Alkaline cleaned and rinsed cold rolled steel panels (4"×6") were coated in the agitated bath for 90 seconds, spray deionized water rinsed for 20 seconds, and baked for 5 m at 475°–500° F. After approximately every 24 panels (8 ft²), the bath was analyzed for each of the inorganic components and replenished. During the course of the experiment, some 244 panels (over 81 ft²) were processed giving organic coatings that were mostly uniform or slightly grainy with film thicknesses ranging from 0.03 to 0.30 mils. At the end of the experiment the filtered coating bath contained 32 ppm soluble iron indicating that the ferric ion level had been substantially controlled.

COATING EXAMPLE VII

A coating bath was prepared having the composition:

| Component | Parts |
|---|---|
| Emulsion V | 750 ml |
| HF (50%) | 0.11% by wt |
| $H_2O_2$ (30%) | 0.4% by wt |
| Dequest 2000 | 0.1% by wt |
| Deionized water | 1000 ml |

Alkali cleaned and rinsed cold rolled steel panels were immersed in the bath for 90 seconds, spray rinsed for 15 seconds with deionized water, and baked for 10 minutes at 400° F. Organic coatings about 0.1 mil thick over a dark brown conversion coating were obtained.

What is claimed is:

1. The method of applying a bonded organic coating to a ferrous substrate comprising the steps of:
   (1) combining an epoxy resin, a cross linking resin, a resin-miscible water-immiscible solvent and at least one emulsifying agent wherein the weight ratio of epoxy resin: cross linking resin is from about 1:1 to about 9:1;
   (2) adding sufficient water and hydrogen peroxide to the combination of step 1 to yield an emulsion having a solids content of from about 5 to about 500 grams per liter and containing from about 1 to about 5 grams per liter of hydrogen peroxide as an oxidizing agent;
   (3) adding sufficient acid or base, if necessary, to adjust the pH value of the emulsion to from about 2 to about 4;
   (4) immersing a ferrous substrate into the coating bath to form a coating thereon; and
   (5) heat curing the coating.

2. The method of claim 1, wherein the coated substrate is water rinsed intermediate steps 4 and 5.

3. The method of applying a bonded organic coating to a ferrous substrate comprising the steps of:
   (1) forming a solution of an epoxy resin and a cross-linking resin selected from the group consisting of aminoplast and phenoplast resins in a resin-miscible water-immiscible solvent wherein the weight ratio of epoxy resin:cross linking resin is from about 1:1 to about 9:1;
   (2) adding at least one emulsifying agent;
   (3) forming an aqueous acidic emulsion coating bath by adding an acid capable of attacking the ferrous substrate in an amount to yield a bath pH of from about 2 to about 4, sufficient water to yield a bath having a resin solids content of from about 5 to about 500 grams per liter and from about 1 to about 5 grams per liter of hydrogen peroxide,
   (4) immersing the ferrous substrate into the coating bath to form a coating thereon, and
   (5) heat curing the coating.

4. The method of claim 3, wherein the bath also contains an iron control agent.

5. The method of claim 3, wherein the substrate is immersed for a period ranging from about 5 to about 1200 seconds.

6. The method of claim 3, wherein the coating is heat cured at a temperature of from about 200° to about 500° F. for a period ranging from about 5 minutes to about 20 minutes.

7. The method of claim 3, wherein the coated substrate is water rinsed intermediate steps 4 and 5.

8. The method of applying a bonded organic coating to a ferrous substrate comprising the steps of:
   (1) forming an aqueous emulsion of an epoxy resin and a cross-linking resin, both in a water-immiscible solvent, and at least one emulsifying agent wherein the weight ratio of epoxy resin:cross linking resin is from about 1:1 to about 9:1,
   (2) forming an aqueous acidic coating bath containing the emulsion of step 1, having a pH of from about 2 to about 4, a solids content of from about 5 to about 500 grams per liter, containing from about 1 to about 5 grams per liter, containing from about 1 to about 5 grams per liter of hydrogen peroxide and containing an amount of iron control agent sufficient to control the build up of soluble iron, (3) immersing a ferrous substrate into the coating bath to form a coating thereon, and,
(4) heat curing the coating.

9. The method of claim 8, wherein the coated substrate is water rinsed intermediate steps 3 and 4.

* * * * *